United States Patent
Rosenberg et al.

(10) Patent No.: US 9,073,015 B2
(45) Date of Patent: Jul. 7, 2015

(54) COMPOSITE POLYAMIDE MEMBRANE

(71) Applicants: Steven Rosenberg, Shorewood, MN (US); Steven D. Jons, Eden Prairie, MN (US); Joseph D. Koob, Jordan, MN (US); Mou Paul, Edina, MN (US); XiaoHua Qiu, Midland, MI (US); Abhishek Roy, Edina, MN (US); Chunming Zhang, Midland, MI (US); Aman A. Desai, Midland, MI (US)

(72) Inventors: Steven Rosenberg, Shorewood, MN (US); Steven D. Jons, Eden Prairie, MN (US); Joseph D. Koob, Jordan, MN (US); Mou Paul, Edina, MN (US); XiaoHua Qiu, Midland, MI (US); Abhishek Roy, Edina, MN (US); Chunming Zhang, Midland, MI (US); Aman A. Desai, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/241,731

(22) PCT Filed: Jan. 3, 2013

(86) PCT No.: PCT/US2013/020072
§ 371 (c)(1),
(2) Date: Feb. 27, 2014

(87) PCT Pub. No.: WO2013/103666
PCT Pub. Date: Jul. 11, 2013

(65) Prior Publication Data
US 2014/0370191 A1 Dec. 18, 2014

Related U.S. Application Data

(60) Provisional application No. 61/583,674, filed on Jan. 6, 2012.

(51) Int. Cl.
*B01D 71/56* (2006.01)
*B01D 67/00* (2006.01)
*B01D 69/12* (2006.01)

(52) U.S. Cl.
CPC ............ *B01D 71/56* (2013.01); *B01D 67/0006* (2013.01); *B01D 67/0093* (2013.01); *B01D 69/125* (2013.01); *B01D 2323/40* (2013.01); *B01D 67/0002* (2013.01)

(58) Field of Classification Search
CPC ... B01D 71/56; B01D 69/125; B01D 67/0006
See application file for complete search history.

(56) References Cited

U.S. PATENT DOCUMENTS

| | | |
|---|---|---|
| 3,304,310 A | 2/1967 | Hari et al. |
| 3,686,116 A | 8/1972 | Rio |
| 3,878,109 A | 4/1975 | Ikeda et al. |
| 4,259,183 A | 3/1981 | Cadotte |
| 4,277,344 A | 7/1981 | Cadotte |
| 4,529,646 A | 7/1985 | Sundet |
| 4,606,943 A | 8/1986 | Rak et al. |
| 4,626,468 A | 12/1986 | Sundet |
| 4,643,829 A | 2/1987 | Sundet |
| 4,719,062 A | 1/1988 | Sundet |
| 4,758,343 A | 7/1988 | Sasaki et al. |
| 4,761,234 A | 8/1988 | Uemura et al. |
| 4,783,346 A | 11/1988 | Sundet |
| 4,812,270 A | 3/1989 | Cadotte et al. |
| 4,830,885 A | 5/1989 | Tran et al. |
| 4,888,116 A | 12/1989 | Cadotte et al. |
| 4,948,507 A | 8/1990 | Tomaschke |
| 4,950,404 A | 8/1990 | Chau |
| 4,960,517 A | 10/1990 | Cadotte |
| 5,015,380 A | 5/1991 | Sundet |
| 5,015,382 A | 5/1991 | Sundet |
| 5,019,264 A | 5/1991 | Arthur |
| 5,051,178 A | 9/1991 | Uemura et al. |
| 5,160,619 A | 11/1992 | Yamaguchi et al. |
| 5,246,587 A | 9/1993 | Tomaschke |
| 5,254,261 A | 10/1993 | Tomaschke et al. |
| 5,290,452 A | 3/1994 | Schucker |
| 5,336,409 A | 8/1994 | Hachisuka et al. |
| 5,510,527 A | 4/1996 | Hachisuka et al. |
| 5,576,057 A | 11/1996 | Hirose et al. |
| 5,582,725 A | 12/1996 | McCray et al. |
| 5,593,588 A | 1/1997 | Kim et al. |
| 5,614,099 A | 3/1997 | Hirose et al. |

(Continued)

FOREIGN PATENT DOCUMENTS

| | | |
|---|---|---|
| CN | 1035338 | 9/1989 |
| CN | 102219673 | 10/2011 |

(Continued)

OTHER PUBLICATIONS

Li et al, Polyamide thin fim composite membranes prepared from isomeric biphenyl tetraacyl chloride and m-phenylenediamine, Jornal of Membrane Science 315, (2008)20-27.

(Continued)

Primary Examiner — Alex A Rolland
(74) Attorney, Agent, or Firm — Edward W. Black

(57) ABSTRACT

A method for making a composite polyamide membrane including the steps of applying a polyfunctional amine monomer and polyfunctional acyl halide monomer to a surface of the porous support and interfacially polymerizing the monomers to form a thin film polyamide layer, wherein the method is includes at least one of the following steps: i) conducting the interfacial polymerization in the presence of a subject monomer comprising at least one carboxylic acid group linked to an aromatic moiety and wherein the aromatic moiety is further substituted with at least one of an acyl halide or anhydride functional group and ii) applying the subject monomer to the thin film polyamide layer. The invention includes many additional embodiments.

4 Claims, No Drawings

(56) References Cited

U.S. PATENT DOCUMENTS

| | | |
|---|---|---|
| 5,616,249 A | 4/1997 | Hodgdon |
| 5,693,227 A | 12/1997 | Costa |
| 5,733,602 A | 3/1998 | Hirose et al. |
| 5,744,039 A | 4/1998 | Itoh et al. |
| 5,783,079 A | 7/1998 | Kumano et al. |
| 5,843,351 A | 12/1998 | Hirose et al. |
| 5,876,602 A | 3/1999 | Jons et al. |
| 5,989,426 A | 11/1999 | Hirose et al. |
| 6,024,873 A | 2/2000 | Hirose et al. |
| 6,086,764 A | 7/2000 | Linder et al. |
| 6,162,358 A | 12/2000 | Li et al. |
| 6,280,853 B1 | 8/2001 | Mickols |
| 6,337,018 B1 | 1/2002 | Mickols |
| 6,406,626 B1 | 6/2002 | Murakami et al. |
| 6,464,873 B1 | 10/2002 | Tomaschke |
| 6,521,130 B1 | 2/2003 | Kono et al. |
| 6,562,266 B2 | 5/2003 | Mickols |
| 6,723,241 B2 | 4/2004 | Mickols |
| 6,723,422 B1 | 4/2004 | Hirose et al. |
| 6,878,278 B2 | 4/2005 | Mickols |
| 7,279,097 B2 | 10/2007 | Tomioka et al. |
| 7,806,275 B2 | 10/2010 | Murphy et al. |
| 7,815,987 B2 | 10/2010 | Mickols et al. |
| 8,147,735 B2 | 4/2012 | Buschmann |
| 8,177,978 B2 | 5/2012 | Kurth et al. |
| 8,567,612 B2 | 10/2013 | Kurth et al. |
| 8,602,222 B2 | 12/2013 | Nakatsuji et al. |
| 2009/0071903 A1* | 3/2009 | Nakatsuji et al. ............ 210/650 |
| 2011/0005997 A1* | 1/2011 | Kurth et al. ............ 210/500.27 |
| 2012/0261332 A1 | 10/2012 | Takagi et al. |
| 2012/0305473 A1 | 12/2012 | Ogawa et al. |
| 2013/0089727 A1 | 4/2013 | Nilsen et al. |
| 2013/0126419 A1 | 5/2013 | Ogawa et al. |
| 2013/0256215 A1 | 10/2013 | Nakatsuji et al. |

FOREIGN PATENT DOCUMENTS

| | | |
|---|---|---|
| JP | 53146275 | 12/1978 |
| WO | 2009129354 | 10/2009 |
| WO | 2010042250 | 4/2010 |
| WO | 2010120326 | 10/2010 |
| WO | 2010120327 | 10/2010 |
| WO | 2012020680 | 2/2012 |
| WO | 2012102942 | 2/2012 |
| WO | 2012090862 | 7/2012 |
| WO | 2012102943 | 8/2012 |
| WO | 2012102944 | 8/2012 |
| WO | 2013032586 | 3/2013 |
| WO | 2013048762 | 4/2013 |
| WO | 2013048763 | 4/2013 |
| WO | 2013048764 | 4/2013 |
| WO | 2013048765 | 4/2013 |
| WO | 2013103666 | 7/2013 |
| WO | 2014014662 | 1/2014 |
| WO | 2014014663 | 1/2014 |
| WO | 2014014664 | 1/2014 |
| WO | 2014014666 | 1/2014 |
| WO | 2014014668 | 1/2014 |
| WO | 2014014669 | 1/2014 |

OTHER PUBLICATIONS

International Patent Application: PCT/US2014/010123, filed Jan. 3, 2014 by Dow Global Technologies LLC.

U.S. Appl. No. 61/818,934, filed May 3, 2013 by Mou Paul.

* cited by examiner

COMPOSITE POLYAMIDE MEMBRANE

TECHNICAL FIELD

The present invention is directed toward composite polyamide membranes derived from combinations of polyfunctional amine, polyfunctional acyl halide and carboxylic acid-containing monomers.

INTRODUCTION

Composite polyamide membranes are used in a variety of fluid separations. One common class of membranes includes a porous support coated with a "thin film" polyamide layer. The thin film layer may be formed by an interfacial polycondensation reaction between polyfunctional amine (e.g. m-phenylenediamine) and poly-functional acyl halide (e.g. trimesoyl chloride) monomers which are sequentially coated upon the support from immiscible solutions, see for example U.S. Pat. No. 4,277,344 to Cadotte. Various constituents may be added to one or both of the coating solutions to improve membrane performance. For example, U.S. Pat. No. 4,259,183 to Cadotte describes the use of combinations of bi- and tri-functional acyl halide monomers, e.g. isophthaloyl chloride or terephthaloyl chloride with trimesoyl chloride. US 2011/0049055 describes the addition of moieties derived from sulfonyl, sulfinyl, sulfenyl, sulfuryl, phosphoryl, phosphonyl, phosphinyl, thiophosphoryl, thiophosphonyl and carbonyl halides. U.S. Pat. No. 6,521,130 describes the addition of a carboxylic acid (e.g. aliphatic and aromatic carboxylic acids) or carboxylic acid ester to one or both monomer coating solutions prior to polymerization. Similarly, U.S. Pat. No. 6,024,873, U.S. Pat. No. 5,989,426, U.S. Pat. No. 5,843,351 and U.S. Pat. No. 5,576,057 describes the addition of selected alcohols, ethers, ketones, esters, halogenated hydrocarbons, nitrogen-containing compounds and sulfur-containing compounds having solubility parameters of 8 to 14 $(cal/cm^3)^{1/2}$ to one of the coating solutions. WO 2009/0107922 describes the addition of various "chain capping reagent" to one or both coating solutions, e.g. 1,3 propane sultone, benzoyl chloride, 1,2-bis(bromoacetoxy) ethane, etc. U.S. Pat. No. 4,606,943 and U.S. Pat. No. 6,406,626 describe the formation of a thin film polyamide using a polyfunctional amine and polyfunctional acyl halide along with a polyfunctional acid anhydride halide (e.g. trimelletic anhydride acid chloride). US 2009/0272692, US 2010/0062156, US 2011/0005997, WO 2009/129354, WO 2010/120326 and WO 2010/120327 describe the use of various polyfunctional acyl halides and their corresponding partially hydrolyzed counterparts. U.S. Pat. No. 4,812,270 to Cadotte describes post-treating the membrane with phosphoric acid. U.S. Pat. No. 5,582,725 describes a similar post treatment with an acyl halide such as benzoyl chloride.

The search continues for new additives that improve the performance of polyamide composite membranes.

SUMMARY

The invention includes a method for making a composite polyamide membrane comprising the steps of applying polyfunctional amine and acyl halide monomers to a surface of a porous support and interfacially polymerizing the monomers to form a thin film polyamide layer. The method further includes at least one of the following steps: i) conducting the interfacial polymerization in the presence of a subject monomer comprising at least one carboxylic acid group linked to an aromatic moiety and wherein the aromatic moiety is further substituted with at least one amine reactive functional group selected from: acyl halide and anhydride and ii) applying the subject monomer to the thin film polyamide layer. The invention includes many additional embodiments.

DETAILED DESCRIPTION

The invention is not particularly limited to a specific type, construction or shape of composite membrane or application. For example, the present invention is applicable to flat sheet, tubular and hollow fiber polyamide membranes useful in a variety of applications including forward osmosis (FO), reverse osmosis (RO), nano filtration (NF), ultra filtration (UF) and micro filtration (MF) fluid separations. However, the invention is particularly useful for membranes designed for RO and NF separations. RO composite membranes are relatively impermeable to virtually all dissolved salts and typically reject more than about 95% of salts having monovalent ions such as sodium chloride. RO composite membranes also typically reject more than about 95% of inorganic molecules as well as organic molecules with molecular weights greater than approximately 100 Daltons. NF composite membranes are more permeable than RO composite membranes and typically reject less than about 95% of salts having monovalent ions while rejecting more than about 50% (and often more than 90%) of salts having divalent ions—depending upon the species of divalent ion. NF composite membranes also typically reject particles in the nanometer range as well as organic molecules having molecular weights greater than approximately 200 to 500 Daltons.

Examples of composite polyamide membranes include FilmTec Corporation FT-30™ type membranes, i.e. a flat sheet composite membrane comprising a bottom layer (back side) of a nonwoven backing web (e.g. PET scrim), a middle layer of a porous support having a typical thickness of about 25-125 μm and top layer (front side) comprising a thin film polyamide layer having a thickness typically less than about 1 micron, e.g. from 0.01 micron to 1 micron but more commonly from about 0.01 to 0.1 μm. The porous support is typically a polymeric material having pore sizes which are of sufficient size to permit essentially unrestricted passage of permeate but not large enough so as to interfere with the bridging over of a thin film polyamide layer formed thereon. For example, the pore size of the support preferably ranges from about 0.001 to 0.5 μm. Non-limiting examples of porous supports include those made of: polysulfone, polyether sulfone, polyimide, polyamide, polyetherimide, polyacrylonitrile, poly(methyl methacrylate), polyethylene, polypropylene, and various halogenated polymers such as polyvinylidene fluoride. For RO and NF applications, the porous support provides strength but offers little resistance to fluid flow due to its relatively high porosity.

Due to its relative thinness, the polyamide layer is often described in terms of its coating coverage or loading upon the porous support, e.g. from about 2 to 5000 mg of polyamide per square meter surface area of porous support and more preferably from about 50 to 500 mg/m². The polyamide layer is preferably prepared by an interfacial polycondensation reaction between a polyfunctional amine monomer and a polyfunctional acyl halide monomer upon the surface of the porous support as described in U.S. Pat. No. 4,277,344 and U.S. Pat. No. 6,878,278. More specifically, the polyamide membrane layer may be prepared by interfacially polymerizing a polyfunctional amine monomer with a polyfunctional acyl halide monomer, (wherein each term is intended to refer both to the use of a single species or multiple species), on at least one surface of a porous support. As used herein, the term "polyamide" refers to a polymer in which amide linkages (—C(O)NH—)occur along the molecular chain. The polyfunctional amine and polyfunctional acyl halide monomers are most commonly applied to the porous support by way of a coating step from solution, wherein the polyfunctional amine monomer is typically coated from an aqueous-based or polar solution and the polyfunctional acyl halide from an organic-based or non-polar solution. Although the coating steps need not follow a specific order, the polyfunctional amine monomer is preferably first coated on the porous support followed by the polyfunctional acyl halide. Coating can be accomplished by spraying, film coating, rolling, or through the use of a dip tank among other coating techniques. Excess solution may be removed from the support by air knife, dryers, ovens and the like.

The polyfunctional amine monomer comprises at least two primary or secondary amino groups and may be aromatic (e.g., m-phenylenediamine, p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, and tris (2-diaminoethyl) amine). Examples of preferred polyfunctional amine monomers include primary amines having two or three amino groups, for example, m-phenylene diamine, and secondary aliphatic amines having two amino groups such as piperazine. One preferred polyfunctional amine is m-phenylene diamine (mPD). The polyfunctional amine monomer may be applied to the porous support as a polar solution. The polar solution may contain from about 0.1 to about 20 weight percent and more preferably from about 0.5 to about 6 weight percent polyfunctional amine monomer. Once coated on the porous support, excess solution may be optionally removed.

The polyfunctional acyl halide monomer comprises at least two acyl halide groups and is preferably coated from an organic-based or non-polar solvent although the polyfunctional acyl halide may be delivered from a vapor phase (e.g., for polyfunctional acyl halides having sufficient vapor pressure). The polyfunctional acyl halide is not particularly limited and aromatic or alicyclic polyfunctional acyl halides can be used along with combinations thereof. Non-limiting examples of aromatic polyfunctional acyl halides include: trimesic acid chloride, terephthalic acid chloride, isophthalic acid chloride, biphenyl dicarboxylic acid chloride, and naphthalene dicarboxylic acid dichloride. Non-limiting examples of alicyclic polyfunctional acyl halides include: cyclopropane tri carboxylic acid chloride, cyclobutane tetra carboxylic acid chloride, cyclopentane tri carboxylic acid chloride, cyclopentane tetra carboxylic acid chloride, cyclohexane tri carboxylic acid chloride, tetrahydrofuran tetra carboxylic acid chloride, cyclopentane dicarboxylic acid chloride, cyclobutane dicarboxylic acid chloride, cyclohexane dicarboxylic acid chloride, and tetrahydrofuran dicarboxylic acid chloride. One preferred polyfunctional acyl halide is trimesoyl chloride (TMC). The polyfunctional acyl halide may be dissolved in a non-polar solvent in a range from about 0.01 to 10 weight percent, preferably 0.05 to 3 weight percent and may be delivered as part of a continuous coating operation. Suitable solvents are those which are capable of dissolving the polyfunctional acyl halide and which are immiscible with water, e.g. hexane, cyclohexane, heptane and halogenated hydrocarbons such as the FREON series. Preferred solvents include those which pose little threat to the ozone layer and which are sufficiently safe in terms of flashpoints and flammability to undergo routine processing without taking special precautions. A preferred solvent is ISOPAR™ available from Exxon Chemical Company. Solvents may be used in various combinations and may also be used in combination with co-solvents.

The non-polar solution may include additional materials including co-solvents, phase transfer agents, solubilizing agents and complexing agents wherein individual additives may serve multiple functions. Representative co-solvents include: benzene, toluene, xylene, mesitylene and ethyl benzene. U.S. Pat. No. 6,878,278, U.S. Pat. No. 6,723,241, U.S. Pat. No. 6,562,266 and U.S. Pat. No. 6,337,018 describe the addition of a broad range of representative complexing agents that may combined with the non-polar solution prior to conducting the interfacial polymerization. A class of such complexing agents is represented by Formula (I).

  Formula (I):

where α is a non-sulfur containing binding core selected from elements falling within: (a) Group IIIA-VIB (i.e., Groups IIIA, IVA, VA, VIA, VIIA, VIIIA, IB, IIB, IIIB, IVB, VB, VIB) and (b) Periods 3-6 (i.e., Periods starting with Na, K, Rb, and Cs) of the conventional IUPAC periodic table. Groups IIIA through VIB of the conventional IUPAC form of the Periodic Table corresponds to: Groups 3-16 of the "new notation" IUPAC Periodic Table and Groups IIIB-VIA of the CAS version of the Periodic Table. In order to avoid any confusion further reference herein will utilize the conventional IUPAC Periodic Table, i.e., Group IIIA corresponds to the column starting with Sc, Y, La, etc, and Group VIB corresponds to the column starting with O, S, Se, Te, Po. Specific examples include: (1) the following metals: aluminum, scandium, titanium, vanadium, chromium, manganese, iron, cobalt, nickel, copper, zinc, gallium, germanium, arsenic, yttrium, zirconium, niobium, molybdenum, technetium, ruthenium, rhodium, palladium, silver, cadmium, indium, tin, antimony, tellurium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, thallium, lead, bismuth (bismuth is not typically preferred), and polonium; (2) the following semi-conductors: silicon, selenium, and germanium and (3) phosphorous. Particularly preferred binding cores include: Al, Si, P, As, Sb, Se and Te and metals such as: Fe, Cr, Co, Ni, Cu, and Zn. L is an optional chemical linking group, the same or different, selected from linkages such as: carbon containing moieties, e.g., aromatic groups, alkanes, alkenes, —O—, —S—, —N—, —H—, —P—, —O—P—, and —O—P—O—, (each of which may be substituted or unsubstituted). β is solubilizing group, the same or different, and includes from 1 to 12 carbon atoms which may be substituted or unsubstituted and which may include internal linking groups as defined by L. Examples include aliphatic and arene groups having 1 to 6 carbon atoms, aromatic groups, heterocyclic groups, and alkyl groups. "x" is an integer from 0 to 1 and "y" is an integer from 1 to 5, preferably from 2 to 4. Although dependent upon the specific solvent(s) and acyl halide species utilized, the following complexing agents are generally useful in the subject invention: tri-phenyl derivatives of phosphorous (e.g., phosphine, phosphate), bismuth, arsenic and antimony; alkane oxy esters of phosphorous including tributyl and dibutyl phosphite; organo-metallic complexes such as ferrocene and tetraethyl lead and acetylacetonate complexes of iron (II), iron (III), cobalt (III) and Cr (III). A preferred class of such complexing agents is represented by Formula (II).

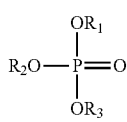

Formula (II)

wherein "P" is phosphorous, "O" is oxygen and $R_1$, $R_2$ and $R_3$ are independently selected from carbon containing moieties. The term "carbon containing moiety" is intended to mean branched and unbranched acyclic groups, e.g., methyl, ethyl, propyl, isopropyl, butyl, isobutyl, pentyl, 2-pentyl, 3-pentyl, tert-butyl, etc., which may be unsubstituted or substituted (e.g., substituted with amide groups, ether groups, ester groups, sulfone groups, carbonyl groups, anhydrides, cyanide, nitrile, isocyanate, urethane, beta-hydroxy ester, double and triple bonds etc.), and cyclic groups, e.g., cyclo pentyl, cyclo hexyl, aromatics, e.g., phenyl, heterocyclic (e.g., pyridine), etc., which may be unsubstituted or substituted, (e.g., substituted with methyl, ethyl, propyl, hydroxyl, amide, ether, sulfone, carbonyl, ester, etc.). Cyclo moieties may be linked to the phosphorous atom by way of an aliphatic linking group, e.g., methyl, ethyl, etc. Preferred carbon containing moieties include unsubstituted, branched or unbranched $C_1$-$C_{12}$ groups, and more preferably $C_1$-$C_8$ aliphatic groups such as: methyl, ethyl, propyl, isopropyl, butyl, 2-methyl butyl, 3-methyl butyl, 2-ethyl butyl, pentyl, hexyl, etc. Additionally, moieties include phenyl groups. When used, the aforementioned complexing agents are preferred added to the organic-based or non-polar coating solution containing the polyfunctional acyl halide in a ratio with the polyfunctional acyl halide monomer of from about 1:5 to 5:1 with 1:1 to 3:1 being preferred. In another preferred embodiment, the concentration of the complexing agent within the coating solutions is from about 0.001 to 2 weight percent.

Once brought into contact with one another, the polyfunctional acyl halide and polyfunctional amine monomers react at their surface interface to form a polyamide layer or film. This layer, often referred to as a polyamide "discriminating layer" or "thin film layer," provides the composite membrane with its principal means for separating solute (e.g. salts) from solvent (e.g. aqueous feed).

The reaction time of the polyfunctional acyl halide and the polyfunctional amine monomer may be less than one second but contact times typically range from about 1 to 60 seconds, after which excess liquid may be optionally removed by way of an air knife, water bath(s), dryer or the like. The removal of the excess solvent can be achieved by drying at elevated temperatures, e.g. from about 40° C. to about 120° C., although air drying at ambient temperatures may be used.

In one embodiment, the subject method includes the step of applying a polyfunctional amine monomer and polyfunctional acyl halide monomer to a surface of the porous support and interfacially polymerizing the monomers to form a thin film polyamide layer. The subject method is characterized by including at least one of the following steps: i) conducting the interfacial polymerization in the presence of an additional "subject" monomer and/or ii) applying such a monomer to the thin film polyamide layer after the interfacial polymerization is substantially complete. The subject monomer is distinct from the polyfunctional amine and acyl halide monomers and comprises at least one carboxylic acid group linked to an aromatic moiety. The aromatic moiety is further substituted with at least one amine reactive functional group. The term "amine-reactive" functional group refers to a functional group that is reactive with the amine functional groups under conditions present during interfacial polymerization, i.e. during the time period and conditions present during formation of the thin film polyamide layer. This generally requires substantial reaction within a few seconds of contact at room temperature under standard atmospheric pressure. Representative examples of amine-reactive functional groups include: acyl halide (e.g. acyl chloride) and anhydride. When present during the interfacial polymerization, the subject monomer is believed to be incorporated within the resulting polyamide structure (i.e. the subject monomer and polyfunctional amine and acyl halide monomers form a reaction product). When applied after the polyamide is formed, the subject monomer is believed to react with residual amine groups present in the thin film polyamide.

As mentioned, the subject monomer comprises an aromatic moiety. Applicable aromatic moieties comprise an aromatic ring structure preferably comprising 14 or less carbon atoms, e.g. benzene, naphthalene, anthracene, phenanthrene, triphenylene, pyrene, anthraquinone, biphenyl, etc. Other representative aromatic ring structures include heteroarenes such as pyridine, pyrazine, furan and thiadiazole. A benzene ring structure is preferred.

In addition to being substituted with at least one "linked" carboxylic acid functional group (including salts thereof) and at least one amine-reactive functional group, the aromatic moiety structure may be optionally substituted with non amine-reactive functional groups (e.g. "non reactive" during the time period and conditions present during formation of the thin film polyamide layer) such as: halogen, ketone, nitrile, sulfone, sulfonyl amides, esters including phosphorous esters, and alkyl and alkenyl groups having from 1 to 12 carbon atoms which may be unsubstituted or substituted with moieties such as halogen, ketone, nitrile and ether groups.

In one class of embodiments, the subject monomer is represented by Formula (III):

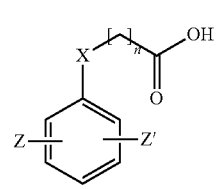

Formula (III)

wherein X is selected from: oxygen (e.g. —O—); amino (—N(R)—) wherein R is selected from hydrogen and hydrocarbon groups having from 1 to 6 carbon atoms, e.g. aryl, cycloalkyl, alkyl-substituted or unsubstituted but preferably alkyl having from 1 to 3 carbon atoms with or without substituents such as halogen and carboxyl groups); amide (—(O)N(R))— with either the carbon or nitrogen connected to the aromatic ring and wherein R is as previously defined; carbonyl (—C(O)—); sulfonyl (—SO$_2$—); or is not present (e.g. as represented in Formula III); n is an integer from 1 to 6, or the entire group is an aryl group; Z is an amine reactive functional groups selected from: acyl halide and anhydride (preferably acyl halide); Z' is selected from the functional groups described by Z along with hydrogen and carboxylic acid. Z and Z' may be independently positioned meta or ortho to the X substituent on the ring. In one set of embodiments, n is 1 or 2. In yet another set of embodiments, both Z and Z' are both the same (e.g. both acyl halide groups). In another set of embodiments, X is selected from alkyl and alkoxy groups having from 1 to 3 carbon atoms. Non-limiting representative classes of embodiments are further represented by the following Formulae wherein Z' and Z are positioned meta to each other.

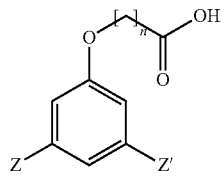
Formula (IV)

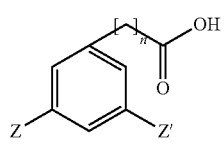
Formula (V)

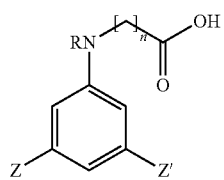
Formula (VI)

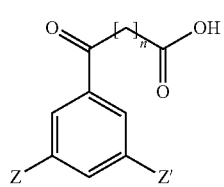
Formula (VII)

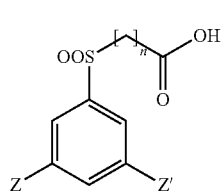
Formula (VIII)

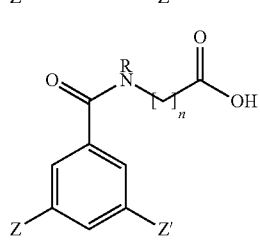
Formula (IX)

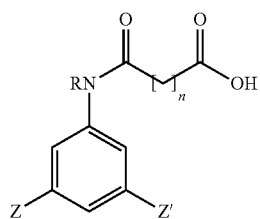
Formula (X)

Non-limiting representative species include: 2-(3,5-bis(chlorocarbonyl)phenoxy)acetic acid, 3-(3,5-bis(chlorocarbonyl) phenyl)propanoic acid, 2-((1,3-dioxo-1,3-dihydroisobenzofuran-5-yl)oxy)acetic acid, 3-(1,3-dioxo-1,3-dihydroisobenzofuran-5-yl)propanoic acid, 2-(3-(chlorocarbonyl) phenoxy)acetic acid, 3-(3-(chlorocarbonyl) phenyl)propanoic acid, 3-((3,5bis(chlorocarbonyl)phenyl) sulfonyl) propanoic acid, 3-((3-(chlorocarbonyl)phenyl)sulfonyl)propanoic acid, 3-((1,3-dioxo-1,3-dihydroisobenzofuran-5-yl)sulfonyl)propanoic acid, 3-((1,3-dioxo-1,3-dihydroisobenzofuran-5-yl)amino) propanoic acid, 3-((1,3-dioxo-1,3-dihydroisobenzofuran-5-yl)(ethyl)amino) propanoic acid, 3-((3,5-bis(chlorocarbonyl) phenyl)amino) propanoic acid, 3-((3,5-bis(chlorocarbonyl) phenyl)(ethyl) amino) propanoic acid, 4-(4-(chlorocarbonyl)phenyl)-4-oxobutanoic acid, 4-(3,5-bis(chlorocarbonyl)phenyl)-4-oxobutanoic acid, 4-(1,3-dioxo-1,3-dihydroisobenzofuran-5-yl)-4-oxobutanoic acid, 2-(3,5-bis(chlorocarbonyl) phenyl)acetic acid, 2-(2,4-bis(chlorocarbonyl)phenoxy) acetic acid, 4-((3,5-bis(chlorocarbonyl) phenyl)amino)-4-oxobutanoic acid, 2-((3,5-bis(chlorocarbonyl)phenyl)amino)acetic acid, 2-(N-(3,5-bis(chlorocarbonyl)phenyl)acetamido)acetic acid, 2,2'-((3,5-bis(chlorocarbonyl)phenylazanediyl) diacetic acid, N-[(1,3-dihydro-1,3-dioxo-5-isobenzofuranyl)carbonyl]-glycine, 4-[[(1,3-dihydro-1,3-dioxo-5-isobenzofuranyl)carbonyl]amino]-benzoic acid, 1,3-dihydro-1,3-dioxo-4-isobenzofuran propanoic acid, 5-[[(1,3-dihydro-1,3-dioxo-5-isobenzofuranyl)carbonyl]amino]-1,3-benzenedicarboxylic acid and 3-[(1,3-dihydro-1,3-dioxo-5-isobenzofuranyl)sulfonyl]-benzoic acid In yet another embodiment, the linking group comprises an aromatic ring, e.g. phenyl ring as represented in Formula (XI).

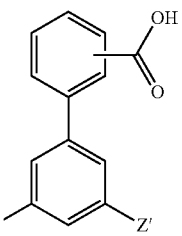
Formula (XI)

wherein the carboxylic acid group may be located meta, para or ortho upon the phenyl ring.

As previously described, the step of applying the polyfunctional monomers to the surface of the porous support preferably involves applying a polar solution comprising the polyfunctional amine monomer and a non-polar solution comprising the polyfunctional acyl halide monomer. The step of applying the solutions preferably involves coating by way of spraying, film coating, rolling, or through the use of a dip tank. In one embodiment, the subject monomer is added to the non-polar solution prior to the application step, e.g. prior to coating the non-polar solution upon the porous support. In such an embodiment, the non-polar solution preferably comprises at least 0.001 weight/volume of the subject monomer. In another embodiment, the non-polar solution comprises from about 0.001 to 0.1 weight/volume of the subject monomer. In still another embodiment, the non-polar solution comprises the subject monomer and polyfunctional acyl halide in a molar ratio of from 0.0001:1 to 1:1, preferably from 0.001:1 to 0.2:1 and more preferably from 0.001:1 to 0.01:1.

In another embodiment, the subject monomer is separately applied to the surface of the porous support (e.g. from a separate solution), either before, during or after the substantial completion of the interfacial polymerization. In such an embodiment, the coating solution is preferably a non-polar solution as previously described and preferably comprises a concentration of the subject monomer from 0.5 to 5% weight/volume, or more preferably from 1 to 3% weight/vol.

While not limited to a particular type of polyamide membrane, the subject invention is particularly suited for application to composite membranes such as those commonly used in RO and NF applications, and more particularly to flat sheet composite polyamide membranes used in RO and NF applications. The thin film polyamide layer may optionally include hygroscopic polymers upon at least a portion of its surface. Such polymers include polymeric surfactants, polyacrylic acid, polyvinyl acetate, polyalkylene oxide compounds, poly(oxazoline) compounds, polyacrylamides and related reaction products as generally described in U.S. Pat. No. 6,280,853; U.S. Pat. No. 7,815,987; US 2009/0220690 and US 2008/0185332 to Mickols and Niu. In some embodiments, such polymers may be blended and/or reacted and may be coated or otherwise applied to the polyamide membrane from a common solution, or applied sequentially.

Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention.

The entire subject matter of each of the aforementioned US patent documents is incorporated herein by reference.

EXAMPLES

All sample membranes were produced using a pilot scale membrane manufacturing line. Polysulfone supports were casts from 16.5 wt. % solutions in DMF and subsequently soaked in aqueous solutions of meta-phenylene diamine (mPD). The resulting supports were then pulled through a reaction table at constant speed while a thin, uniform layer of an organic solution was applied. The organic solution included isoparaffinic (ISOPAR L), trimesoyl acid chloride (TMC) and a subject monomer identified below. Excess organic solution was removed and the resulting composite membranes were passed through water rinse tanks and drying ovens. The sample membranes were then tested using an aqueous solution including 2000 ppm NaCl at a pH 8, room temperature and 1 mPa.

Sample composite polyamide membranes were made using an aqueous 3.5 wt. % mPD solution and an organic solution including TMC and a subject monomer, e.g. 2-(3,5-bis(chlorocarbonyl)phenoxy)acetic acid as represented by Formula (XII) or 3-(3,5-bis(chlorocarbonyl) phenyl)propanoic acid as represented by Formula (XIII). The total acid chloride content of the organic solutions used to prepare each sample was held constant at 0.13% w/v. The concentration of the subject monomer was varied from 0 to 0.019% w/v while the remaining acid chloride content was contributed solely by TMC. Sample numbers 1-4 correspond to membranes including the subject monomer represented by Formula (XII) and numbers 5-8 correspond to membrane including the subject monomer represented by Formula (XIII).

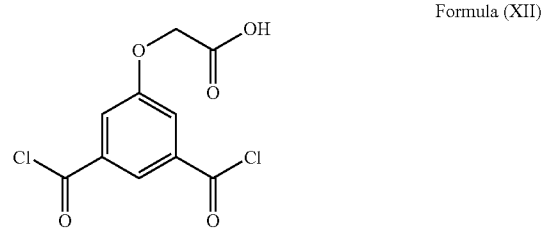

Formula (XII)

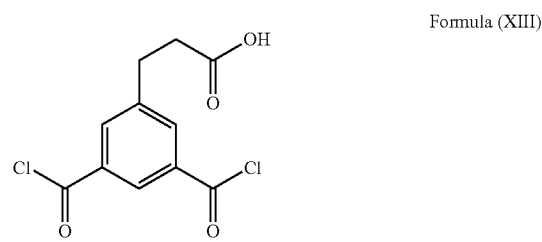

Formula (XIII)

The composite polyamide membranes where tested as described above and a summary of the results is provided below in Table 1. As demonstrated, membranes which were made using the subject monomers demonstrated increased flux when compared with controls.

TABLE 1

| Sample No. | Subject monomer conc. (% w/v) | Avg. Flux (GFD) | Avg. NaCl passage (%) | Std Dev (Avg. Flux) | Std Dev (Avg. NaCl passage) |
| --- | --- | --- | --- | --- | --- |
| 1 | 0 | 21.2 | 0.47% | 0.17 | 0.01% |
| 2 | 0.005 | 21.9 | 0.58% | 0.17 | 0.03% |
| 3 | 0.01 | 27.6 | 0.51% | 0.22 | 0.03% |
| 4 | 0.019 | 30.1 | 0.49% | 0.24 | 0.04% |
| 5 | 0 | 24.6 | 0.78% | 0.32 | 0.05% |
| 6 | 0.005 | 28.2 | 0.72% | 0.51 | 0.05% |
| 7 | 0.01 | 28.7 | 0.69% | 0.37 | 0.12% |
| 8 | 0.019 | 27.6 | 0.80% | 1.48 | 0.06% |

The invention claimed is:

1. A method for making a composite polyamide membrane comprising a porous support and a thin film polyamide layer, wherein the method comprises the step of applying a polyfunctional amine monomer and polyfunctional acyl halide monomer to a surface of the porous support and interfacially polymerizing the monomers to form a thin film polyamide layer, wherein the method is characterized by including at least one of the following steps: i) conducting the interfacial polymerization in the presence of a subject monomer and, ii) applying the subject monomer to the thin film polyamide layer, wherein the subject monomer is represented by Formula (V):

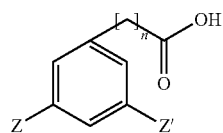
Formula (V)

wherein n is an integer from 1 to 6; Z is selected from acyl halide and anhydride; and Z' is selected from acyl halide, anhydride, hydrogen and carboxylic acid.

2. The method of claim 1 wherein Z and Z' are both acyl halide groups.

3. The method of claim 1 wherein the step of applying the polyfunctional monomers to the surface of the porous support comprises applying a polar solution comprising the polyfunctional amine monomer and a non-polar solution comprising the polyfunctional acyl halide monomer; and wherein the non-polar solution further comprises the subject monomer.

4. The method of claim 1 comprising the step of applying a solution comprising the subject monomer to the thin film polyamide layer.

* * * * *